(12) United States Patent
Wang et al.

(10) Patent No.: US 9,061,615 B2
(45) Date of Patent: Jun. 23, 2015

(54) FOLDING HEADREST

(71) Applicant: Daimay North America Automotive, Inc., Redford, MI (US)

(72) Inventors: Jianhua Wang, Novi, MI (US); Yingtai Jiang, Shanghai (CN); Guojun Tang, Zhousan (CN); Xiaoguang Wang, Windsor (CA)

(73) Assignee: DAIMAY NORTH AMERICA AUTOMOTIVE, INC., Redford, MI (US)

( * ) Notice: Subject to any disclaimer, the term of this patent is extended or adjusted under 35 U.S.C. 154(b) by 50 days.

(21) Appl. No.: 13/714,388

(22) Filed: Dec. 13, 2012

(65) Prior Publication Data

US 2014/0167476 A1    Jun. 19, 2014

(51) Int. Cl.
*B60N 2/48*    (2006.01)

(52) U.S. Cl.
CPC .................................. *B60N 2/4844* (2013.01)

(58) Field of Classification Search
CPC ...... A47C 7/38; B60N 2/4852; B60N 2/4855; B60N 2/4847; B60N 2/485
USPC ................................................. 297/403, 408
See application file for complete search history.

(56) References Cited

U.S. PATENT DOCUMENTS

| | | | |
|---|---|---|---|
| 2007/0164593 A1* | 7/2007 | Brockman | 297/408 |
| 2007/0284929 A1* | 12/2007 | Keller et al. | 297/408 |
| 2010/0219670 A1* | 9/2010 | Jammalamadaka et al. | 297/408 |
| 2011/0095592 A1* | 4/2011 | Willard et al. | 297/408 |
| 2012/0068517 A1* | 3/2012 | Yetukuri et al. | 297/408 |

FOREIGN PATENT DOCUMENTS

CN    102649405 A  *  8/2012  ............... B60N 2/48

* cited by examiner

*Primary Examiner* — David R Dunn
*Assistant Examiner* — Jody Giacoman
(74) *Attorney, Agent, or Firm* — Carlson, Gaskey & Olds, P.C.

(57) ABSTRACT

A folding headrest is disclosed, supported by a mounting rod bar beam, comprising a headrest shell connected to a housing, wherein the housing is pivotably supported on a shaft fixed to the mounting rod, wherein the housing is preloaded for rotation with respect to the shaft by a first torsion spring, an actuating button connected to in sliding communication with the headrest shell, the button in contact with a pushrod, wherein the pushrod passes within into the housing, a force direction-changing L-shaped lever pivot arm pivotably connected to pivotably disposed on the housing, wherein the longitudinal axis of the pushrod is substantially orthogonal to a plane containing the axis of rotation of the force direction-changing lever, a locking lever pivotably connected to pivotably disposed on the housing.

6 Claims, 7 Drawing Sheets

FOLDING HEADREST

CROSS-REFERENCE TO RELATED APPLICATIONS

None.

TECHNICAL FIELD

The invention relates to folding headrests for automobile passenger seats.

SUMMARY OF THE INVENTION

A folding headrest is disclosed, supported by a mounting rod bar beam, comprising a headrest shell connected to a housing, wherein the housing is pivotably supported on a shaft fixed to the mounting rod, wherein the housing is preloaded for rotation with respect to the shaft by a first torsion spring, an actuating button connected to in sliding communication with the headrest shell, the button in contact with a pushrod, wherein the pushrod passes within into the housing, a force direction-changing L-shaped lever pivot arm pivotably connected to pivotably disposed on the housing, wherein the longitudinal axis of the pushrod is substantially orthogonal to a plane containing the axis of rotation of the force direction-changing lever, a locking lever pivotably connected to pivotably disposed on the housing, wherein a plane containing the locking lever is substantially orthogonal to the plane of the pushrod, a cam attached fixed to the shaft, wherein the cam is substantially within the housing, wherein the shaft housing is preloaded by a first torsion spring, wherein the cam has a notch concave feature, wherein the cam is substantially within the same plane as the locking lever, the locking lever further having a tooth, wherein the tooth substantially engages the notch concave feature when the headrest is not folded, wherein a coil spring between the housing and the locking lever resiliently biases the locking lever toward the cam.

DESCRIPTION OF THE PREFERRED EMBODIMENT

Figures 1, 2, 3:
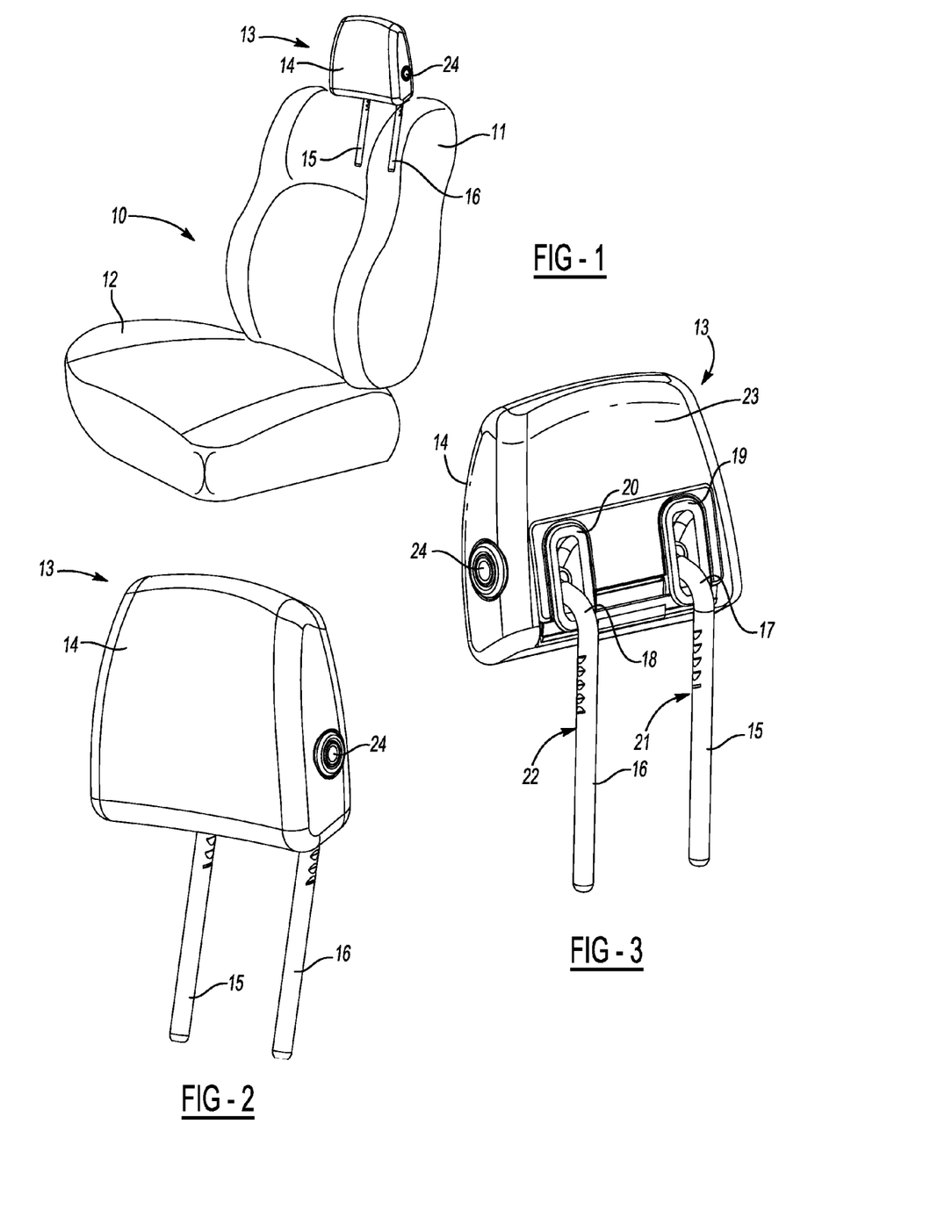
FIG. 1 is a front isometric view of an automobile passenger seat having the folding headrest invention.
FIG. 2 is a front isometric view of the folding headrest of FIG. 1.
FIG. 3 is a rear isometric view of the folding headrest of FIG. 1.

Referring to FIG. 1, a front isometric view is shown of automobile passenger seat 10 having the folding headrest invention. Automobile passenger seat 10 has upper and lower seat portions, 11, 12, respectively. Folding headrest or head restraint 13 with upholstered cover 14 is connected to upper seat portion 11 via first and second mounting rods, 15, 16, respectively. Button 24 is shown for actuating the folding mechanism within headrest 13.

Referring to FIG. 2, a front isometric view of folding headrest 13 is shown, separate from passenger seat 10.

Referring to FIG. 3, a rear isometric view of the folding headrest 13 is shown. First and second mounting rods 15, 16, have bends 17, 18, respectively, which facilitate attachment of the mounting posts to the headrest via back 23 of the headrest. The bends pass through elongated cups 19, 20, respectively, wherein the cups are connected to the back shell of the inner headrest assembly (not shown). The cups may limit the range of folding and raising the headrest, as well as retain foam sponge padding within the headrest in its proper position, and prevent foreign objects from being inserted into the back of the headrest. Retention of the headrest at various vertical positions may be accomplished using spring-loaded means (not shown) within upper seat portion 11 together with plurality of notches, 21, 22, as known to persons of ordinary skill in the art.

Figure 4:
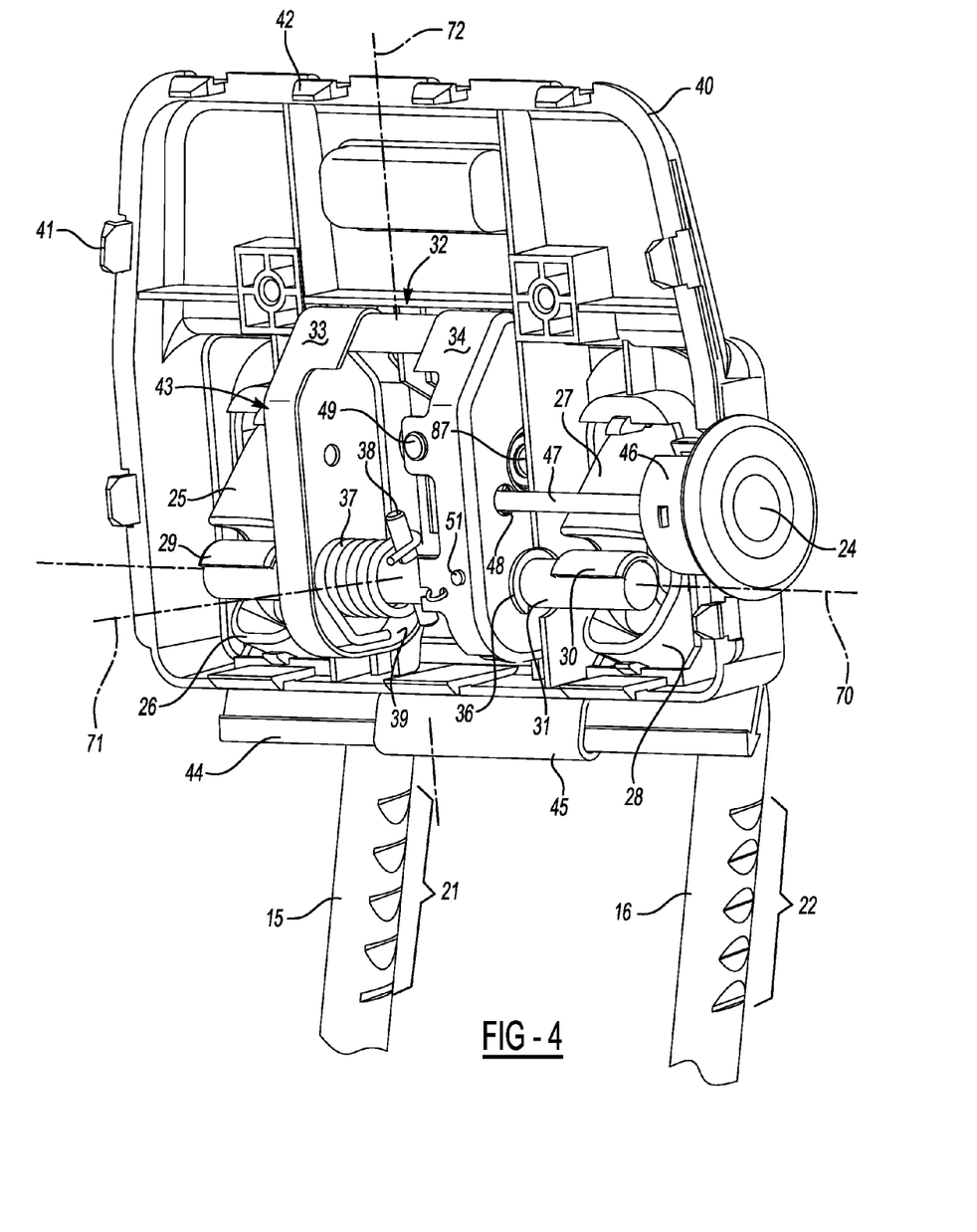
FIG. 4 is a partly-isometric, partly-disassembled view of an inner headrest assembly and associated components, with the front headrest shell removed, for the headrest of FIG. 1.

Referring to FIG. 4, a partly-isometric, partly-disassembled view is shown of an inner headrest assembly and associated components, with the front headrest shell removed. As described herein, mounting post 15 has a bend which facilitates its entering the back of headrest 13 between upper and lower surfaces 25, 26, of elongated cup 19 and then attaching to the first end of shaft 31. Similarly, mounting post 16 enters the back of the headrest between upper and lower surfaces 27, 28, of elongated cup 20 and attaches to the second end of shaft 31. The upper ends of mounting posts 15, 16, terminate with arcuate portions 29, 30, respectively. Shaft 31 is connected between arcuate portions 29, 30. First and second inner housings 33, 34, are connected by beam 32, and are pivotably disposed on shaft 31. Housings 33, 34, are restrained from movement along shaft 31 by C-clips 35, 36. Shaft 31 has first torsion spring 37 interposed between stationary pin 38, which is fixed to shaft 31, and inner lower rear surface 39 of housing 33. Torsion spring is preloaded for the reasons described herein. Front headrest shell (not shown) is connected to rear headrest shell 40 via flexible locking tabs at 41, 42, for example. The front and rear headrest shells fit closely around housings 33, 34, so as to connect the foam padding and cover 14 to folding and locking subassembly 43. Folding and locking subassembly 43 may also be described as the unlocking and locking mechanism, or the unlatching and latching mechanism. Cover 14 (not shown in FIG. 4) utilizes downwardly-extending wall 44 having a substantially arrow-shaped cross section, and J-shaped channel 45 to smoothly tautly fittingly secure the cover about the shells and foam padding. Button guide 46 having button 24 is connected to the front shell. The interior end of the button shaft is adjacent one end of pushrod 47. Pushrod 47 extends through aperture 48 in housing 34 so as to actuate cam engagement and disengagement mechanism 60. Engagement mechanism 60 comprises first pivot 49, pivot lever 75 having surface 97, locking lever 76, coil spring 77, second torsion spring 90, second pivot 87, pin 88 and tooth 98 having tip 99. See also FIGS. 10-11. Bumper 51 is attached to housing 34. Folding and locking subassembly 43 comprises housings 33 and 34, beam 32, shaft 31, first torsion spring 37, stationary pin 38, engagement mechanism 60, cam 53 and bumper 51.

Figure 5:
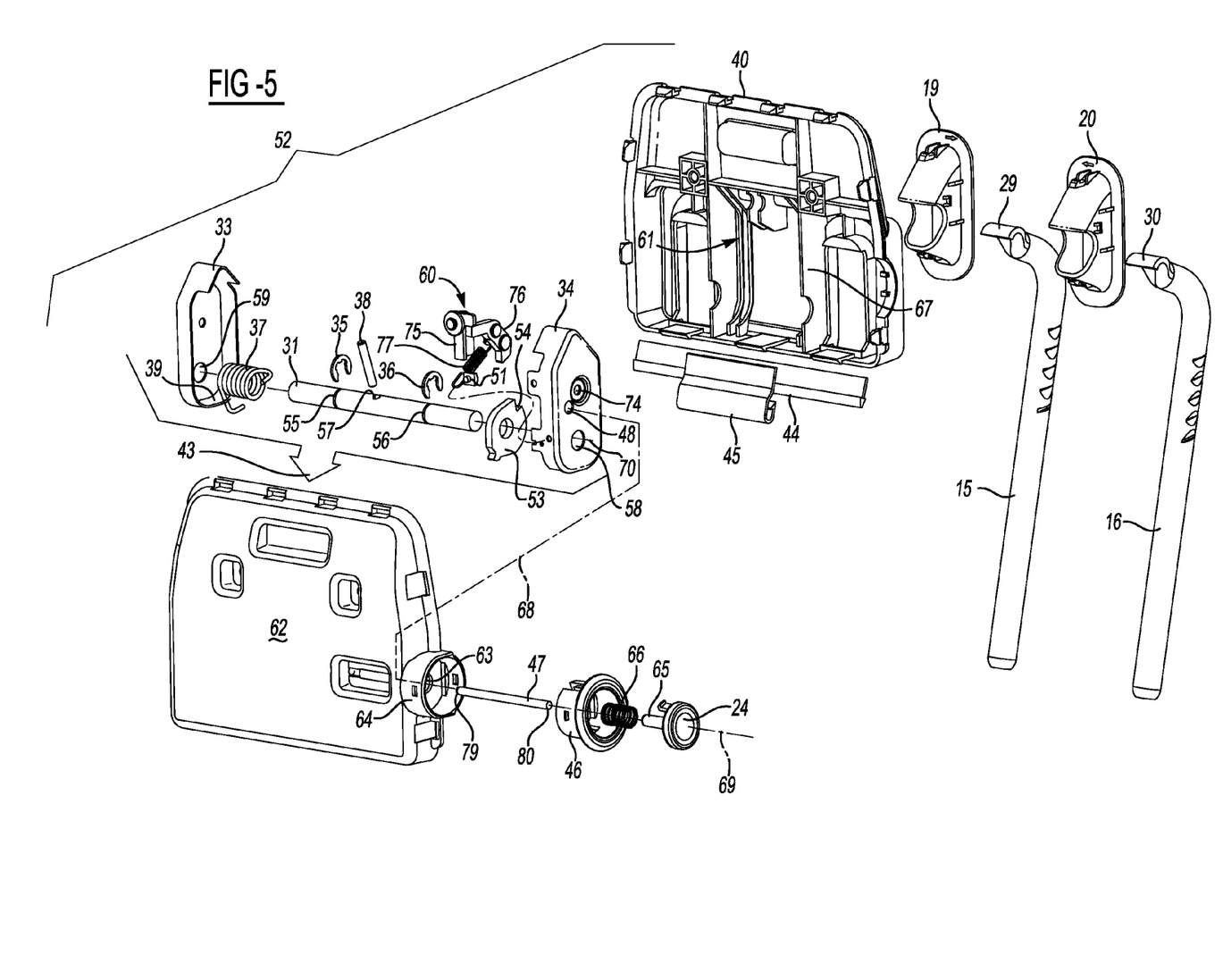
FIG. 5 is an exploded view of the inner headrest assembly and associated components of FIG. 4.

Referring to FIG. 5, an exploded view is shown of inner headrest assembly and associated components 52. When assembled, cam 53 with notch 54 is substantially rigidly secured to shaft 31 inboard of groove 56. Pin 38 is secured to shaft 31 via hole 57. Shaft 31 is within aperture 58 of housing 34. Cam engagement and disengagement mechanism 60 is pivotably retained on housing 34. Housing 34 is inboard of groove 56 and pivotably retained on shaft 31 via C-clip 36. Engagement mechanism 60 is engaged with notch 54 of cam 53. First torsion spring 37 is over shaft 31 and inboard of groove 55. Shaft 31 is within aperture 59 of housing 33. Housing 33 is inboard of groove 55 and pivotably retained on shaft 31 via C-clip 35. First torsion spring 37 is interposed between stationary pin 38 and inner lower rear surface 39 of housing 33 with a selected torque preload applied. The ends of shaft 31 are attached to arcuate portions 29, 30, using a process such as welding, staking, fastening, etc. Housing 33 fits into cavity 61 of shell 40. Housing 34 fits into a corresponding cavity (not shown) which is adjacent to wall 67 of shell 40. Folding and locking subassembly 43 is between front headrest cover 62 and rear headrest cover 40. Front cover 62 snap-fits to rear cover 40 via flexible locking tabs and corresponding slots. Pushrod 47 is inserted through aperture 63 of retainer 64 and aperture 48 of housing 34, as indicated by line 68. Button guide 46 is assembled with button retainer 64 via flexible locking tabs and corresponding slots. Button 24 having end 65 and button spring 66 is assembled with button guide 46.

Figure 6:
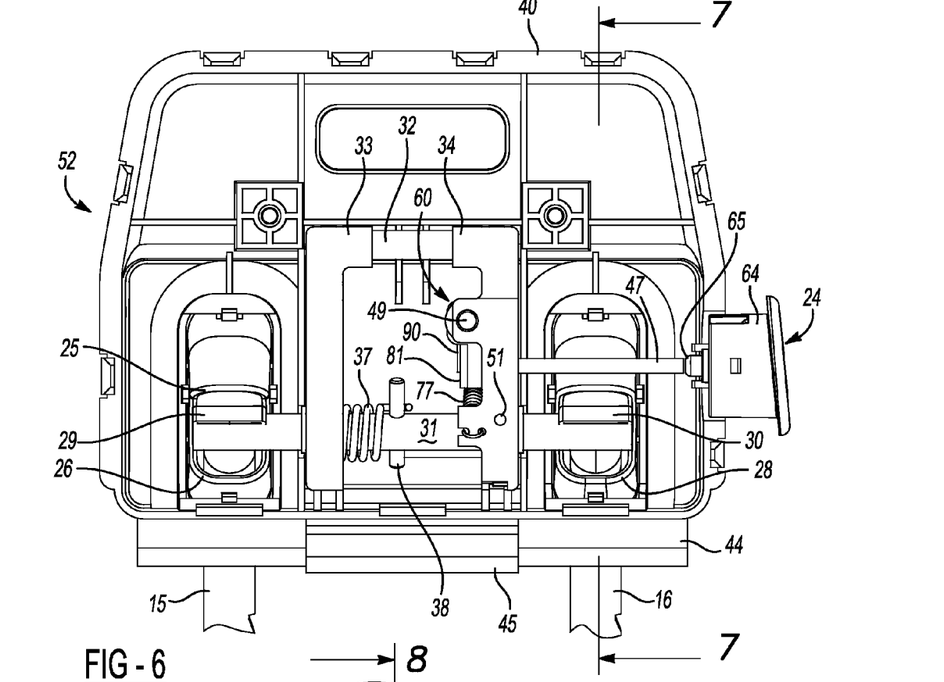
FIG. 6 is a front view of the inner headrest assembly and associated components of FIG. 4.

Referring to FIG. 6, a front view is shown of inner headrest assembly 52, with front cover 62 removed. Engagement mechanism 60 is substantially contained within housing 34. Torsion spring 37 extends laterally into housing 33. Button shaft end 65 may substantially be in contact with pushrod 47. Pushrod 47 may be substantially parallel with shaft 31 and lateral axis 70. The outer periphery of button retainer 64 and button 24 may be angled with respect to vertical axis 72 in order to substantially conform their profiles with the adjacent surrounding outer surface of the headrest.

Figure 7:
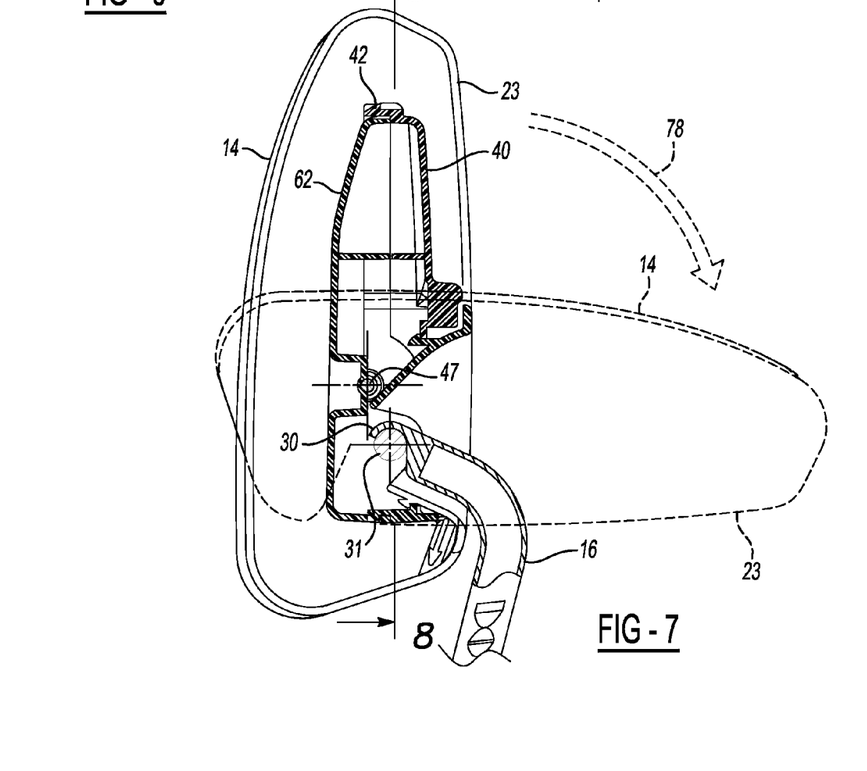
FIG. 7 is a sectional side view taken along line 7-7 in FIG. 6, showing the headrest in upright and folded positions.

Referring to FIG. 7, a sectional side view of the headrest is shown taken along line 7-7 in FIG. 6. The upright or locked position of the headrest is indicated by the solid lines for cover 14, and the folded position by the dashed lines for cover 14. The headrest pivots or "folds" in the direction of arrow 78 about shaft 31, which lies on lateral axis 70. The angle of rotation or folding is selectable, as described herein.

Figure 8:
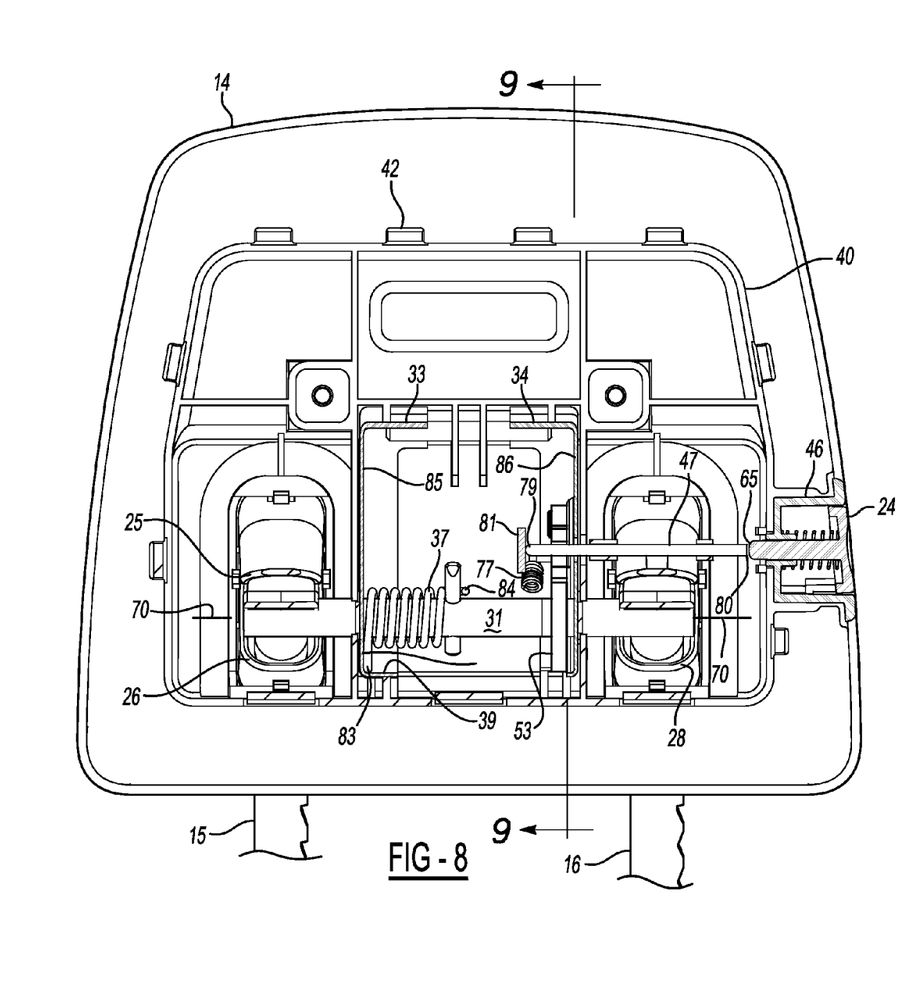
FIG. 8 is a partly-sectional front view taken along line 8-8 in FIG. 7.

Referring to FIG. 8, a partly-sectional front view of the headrest is shown taken along line 8-8 in FIG. 7, with housings 33, 34, shown in cross section. First torsion spring 37 is interposed between stationary pin 38 and inner lower rear surface 39 of housing 33. A selected torque preload is transmitted to shaft 31 by angled tang 83 and substantially U-shaped tang 84. Angled tang 83 is in contact with and bears upon inner lower rear surface 39 near inner wall 85 of housing 33. U-shaped tang 84 is in contact with and bears upon pin 38. Button guide 46 is shown in cross section, as is button 24 and button spring 66. Button shaft end 65 is substantially aligned with shaft 47 and may contact second end 80 of shaft 47. First end 79 of shaft 47 may contact surface 97 of pivot lever 75. See also FIGS. 10 and 12.

Figure 9:
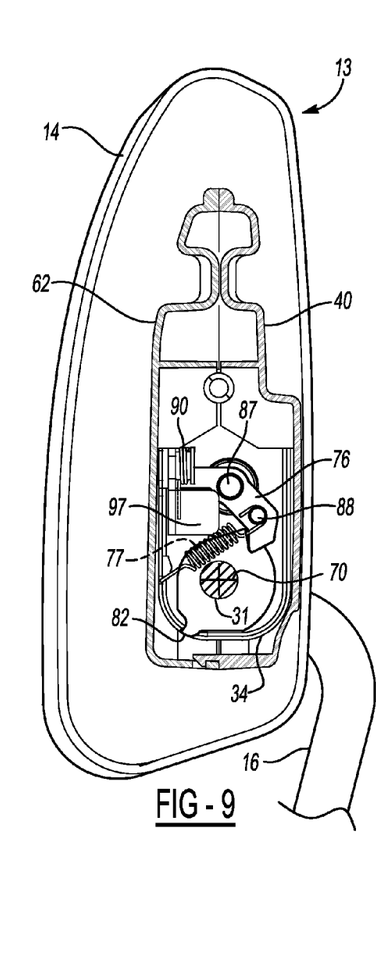
FIG. 9 is a partly-sectional side view taken along line 9-9 in FIG. 8.
Figure 11:
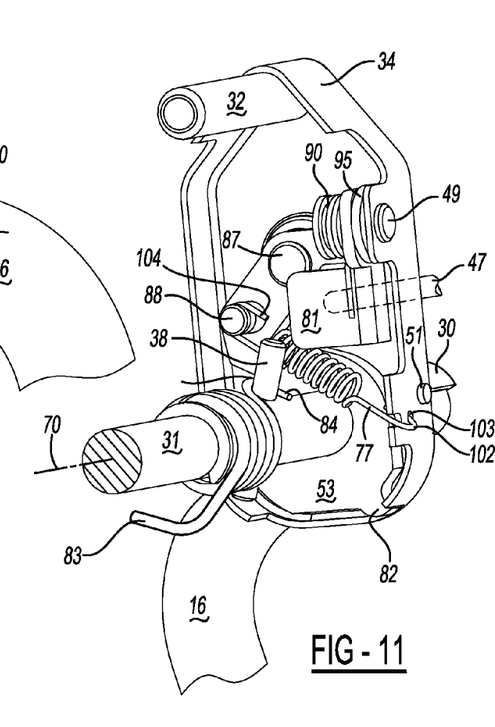
FIG. 11 is an isometric view of details of the engagement mechanism and its housing from a perspective which is rotated from that of FIG. 10.

Referring to FIG. 9 a partly-sectional side view of the headrest is shown taken along line 9-9 in FIG. 8. The upright or locked position of the headrest is shown. Shaft 31 is fixed to mounting post 16. Cam 53 is shown with protrusion or tooth 82 engaging or nearly engaging the inner lower front surface 39 of housing 34 (preventing further "forward" or counterclockwise rotation of headrest 13 about shaft 31). See also FIG. 11. Locking lever 76 is resiliently biased via pin 88 by coil spring 77 so that lever 76 is urged clockwise about pivot 87 within hole 74 of inner wall 86 of housing 34. Pushrod 47 bears upon surface 97 when button 24 is actuated along axis 69 in FIG. 5 by the user. Surface 97 of pivot lever 75 is biased towards end 79 of pushrod 47 along lateral axis 70 towards the viewer of FIG. 9 by second torsion spring 90. Second torsion spring 90 is supported by first pivot 49 affixed to housing 34. Refer also to FIG. 11.

Figure 10:
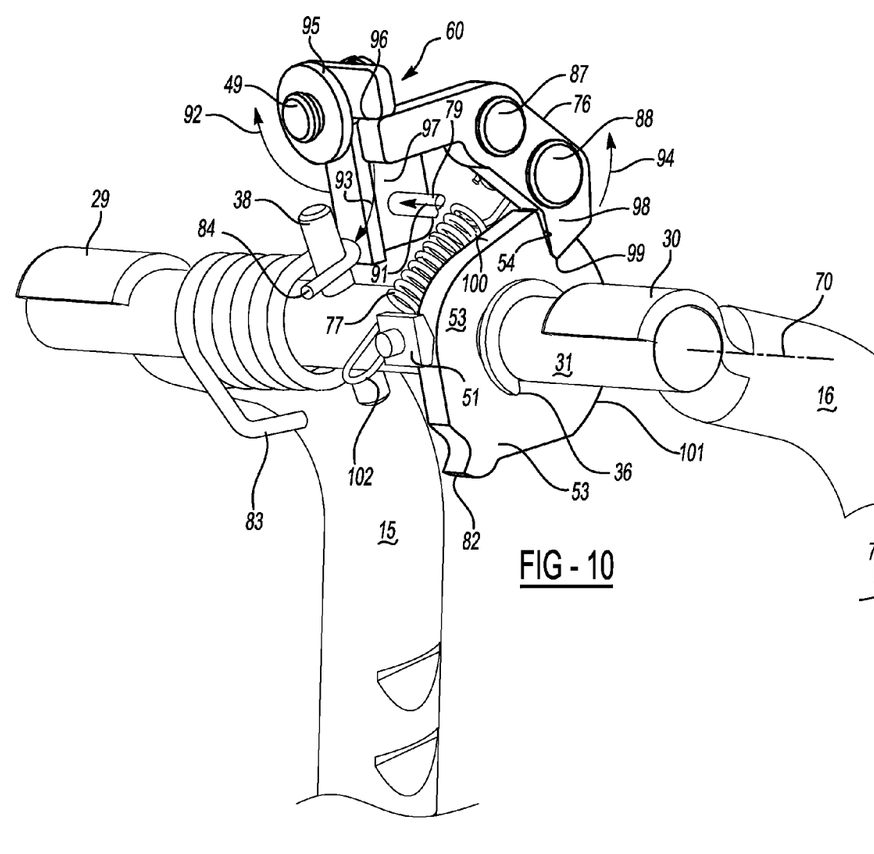
FIG. 10 is an isometric view of the engagement mechanism in partial isolation.
Figure 12:
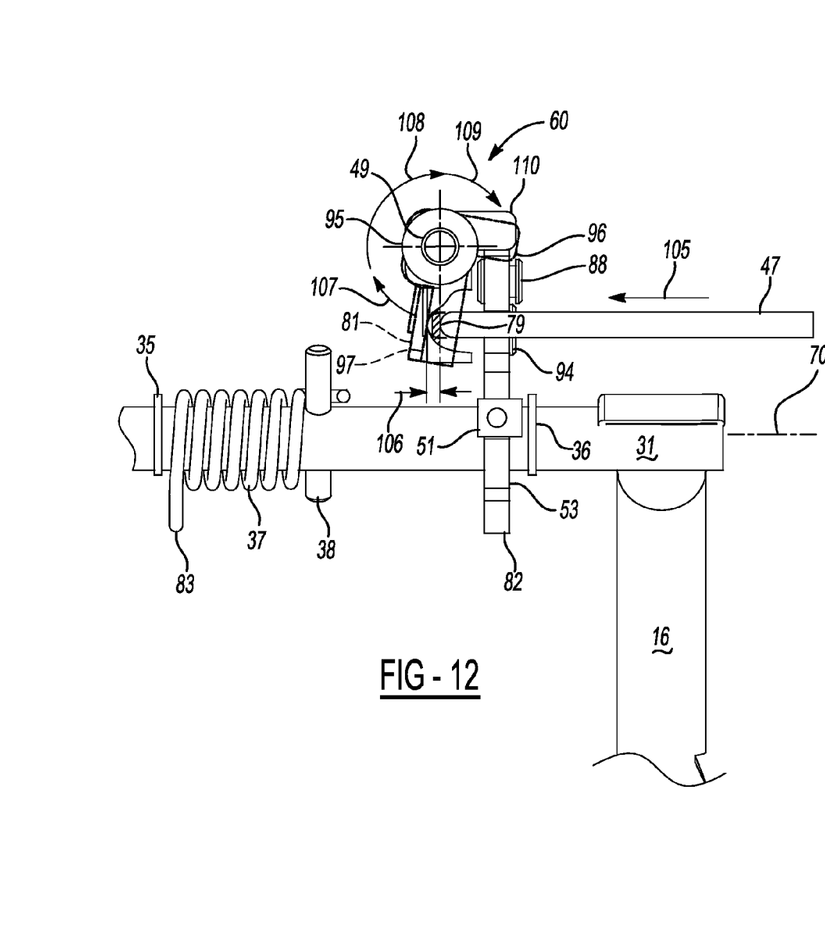
FIG. 12 is a front view of details of the engagement mechanism.

Referring to FIG. 10, an isometric view is shown of engagement mechanism 60 in partial isolation (from its housing 34), together with components of the folding and locking subassembly. The upright or locked position of headrest 13 is shown in FIGS. 1-6 and 8-10. The locked position is also indicated by the solid lines for cover 14 in FIG. 7 as well as the solid line indicating the outline of the headrest at lower reference number 111 in FIG. 13. In the locked position or condition, first torsional spring 37 (a.k.a. spring for mounting shaft 31) is preloaded so as to tend to rotate headrest 13 clockwise (per arrow 78 in FIG. 7) about lateral axis 70 when viewed from the "button side" of headrest 13. Furthermore, in the locked condition tooth 98 of lock lever 76 is engaged with notch 54 of cam 53. In operation, the sequence of steps resulting in headrest 13 folding back with respect to passenger seat 10 and longitudinal axis 71 begins with the user applying a substantially normal force to button 24 via the user's finger or thumb. The normal force applied must be sufficient to overcome the combined restorative forces produced by button linear coil spring 66, pivot lever torsional spring 90, and locking lever coil spring 77. Referring to FIGS. 5, 10 and 12, this normal force transmitted from button 24 via shaft 47 is applied as indicated by arrow 91 to surface 97 of pivot lever 75. The resulting force causes the pivot lever to rotate about first pivot 49, as indicated by arrow 92. In conjunction, the downward force imparted at interface surface 96 on locking lever 76 as indicated by arrow 93 causes locking lever 76 to pivot upwards, i.e. be lifted, as indicated by arrow 94 about pin 87. Pin 87 is substantially rigidly affixed to housing 34. As locking lever 76 pivots upward, tooth 98 becomes progressively unseated or disengaged from engagement with notch 54. Because of the preload torque moment force produced by torsional spring 37, tip 99 of the locking lever is in sliding communication with the right portion (as viewed in FIG. 13) of V-shaped notch 54. When button 24 has been sufficiently depressed so as to cause tip 99 to reach outer surface 101 of notch 54, the restraint of tooth 98 on spring 37 is removed. Urged by the moment created by spring 37 on housings 34, 35, i.e. the force transmitted by tangs 83, 84, respectively, the housings are urged to pivot backwards with respect to the passenger seat. See arrow 78 in FIG. 7. Tip 99 moves along surface 101 of cam 53 until bumper 51 of housing 34 makes contact with surface 100 of the cam. See FIG. 13. In the position indicated by dashed lines in FIG. 13, housings 33, 34, cannot rotate further on shaft 31. In this folded condition, the height of headrest assembly has been reduced relative to vertical axis 72 and upper seat portion 11. Therefore when upper seat portion 11 is folded forward, it folds forward more freely and with less chance of contacting the front dashboard, for example, or of contacting the driver's seat if headrest 13 is used with a rear passenger seat in a van.

Referring to FIG. 11, an isometric view is shown of details of engagement mechanism 60 and housing 34 from a perspective which is rotated from that of FIG. 10. Spring 77 for locking lever 76 is connected at tang 102 to housing 34 via hole 103. Furthermore, spring 77 is connected at tang 104 to pin 88 extending inboard towards vertical axis 72 from locking lever 76. Washer or spacer 95 is located on first pivot 49 between pivot lever 75 and housing 34. Spacer 95 may be comprised of materials such as various metals and polymers. One tang of second torsion spring 90 bears on surface 81 of pivot lever 75, and the other tang is affixed to first pivot 49.

Referring to FIG. 12, a front view of details of engagement mechanism 60 is shown. Pivot arm 75 rotates about first pivot 49 in response to force transmitted via button 24 to pushrod 47 in the direction of arrow 105. This force must be sufficient to overcome the combined restorative forces of button spring 66, pivot lever spring 90, and locking lever spring 77 (as well as frictional forces within the system). When such a force is achieved by the user, first end 79 of pushrod 47 causes angular displacement of pivot arm 75, resulting in linear displacement of surface 97 a selected distance, indicated by the two arrows at 106. The angular displacement of pivot arm 75 is indicated by arrows 107, 108 and 109. Accordingly, locking lever end 110 of pivot arm 75 transmits a substantially downward force (with respect to vertical axis 72) on locking lever 76 at interface 96 between the two components.

Figure 13:
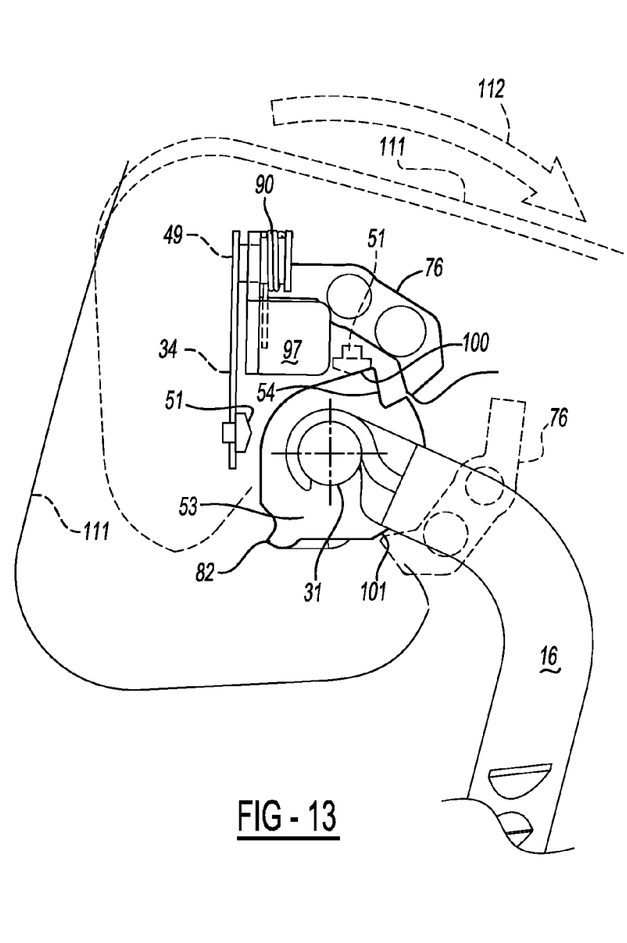
FIG. 13 is a side view of details of the engagement mechanism, showing the headrest in upright and folded positions.

Referring to FIG. 13, a side view is shown of details of engagement mechanism 60. The headrest is shown in both upright and folded positions. The upright position is indicated by the solid line of the headrest's outline at lower reference number 111. When unlocking or unlatching of an upright headrest is impending because sufficient force has been applied to button 24 as described herein, the positions of the components of the engagement mechanism (second torsion spring 90, the periphery of surface 97, locking lever 76, etc.) are also indicated by solid lines. In this state of impending angular or rotary motion, the tip of locking lever 76 has just been raised a sufficient amount to clear the right side of V-shaped notch 54. When this occurs, torsion spring 37 is able to impart rotation to the headrest (via housings 34 and 35) about shaft 31 as indicated by dashed arrow 112. This causes the headrest to move to the folded position indicated by the dashed lines of the headrest's outline, per upper reference number 111. Because the engagement mechanism is connected to housing 34, it also rotates about shaft 31 to the position indicated (solely) by locking lever 76 in dashed lines. During the time rotation is occurring, the tip of locking lever 76 is substantially in sliding communication with surface 101 of cam 53. As described herein, cam 53 is affixed to shaft 31 and the cam's position does not change. Prior to folding, elastomeric bumper 51 on housing 34 is spaced a selected distance from the outer surface of cam 53. However in the headrest's folded position, bumper 51 rotates about shaft 31 until it contacts cam 53 at surface 100. See the dashed lines in FIG. 13 for bumper 51. Due to the torque produced by spring 37, the folding operation can occur fairly rapidly. Bumper 51 may cushion the contact between housing 34 and cam 53 as the headrest decelerates to a stationary, resting, folded state. Furthermore, bumper 51 may have a selected height, wherein the greater the height the smaller the angle of rotation that the headrest is permitted to undergo. This may also be achieved by changing other parameters, such as the profile of surface 100 of the cam. When surface 100 extends a greater distance from the center of shaft 31, i.e. the lateral axis, the angle of rotation that the headrest is permitted to undergo becomes smaller. To relock or relatch the headrest in its upright position, the user uses one or two hands to rotate the headrest in the direction opposite dashed arrow 112 (against the force of spring 37). During this locking operation, bumper 51 is unseated from surface 100 of cam 53. Furthermore, the tip of locking lever 76 substantially remains in sliding communication with surface 101 until notch 54 is encountered. When sufficient torque has been applied by the user to the headrest so as to overcome the restoring force of torsion spring 37, the headrest achieves the upright position indicated by lower reference number 111. The headrest is prevented from rotating too far forward (relative to longitudinal axis 71) when protrusion 82 engages housing 34 as described herein. Finally, the tip of locking lever 76 substantially re-engages with notch 54, the tip being substantially moved into the notch due to the restoring force applied to it via pin 88 and spring 77.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will also include all embodiments falling within the scope of the following claims.

The invention claimed is:

1. A folding headrest, comprising:
   first and second mounting rods;
   a headrest shell connected to a housing, wherein the housing is pivotably supported on a shaft fixed to the mounting rods, wherein the housing is preloaded for rotation with respect to the shaft by a first torsion spring;
   an actuating button connected to the headrest shell, the button in contact with a pushrod, wherein the pushrod passes within into the housing;
   an L-shaped lever pivotably connected to the housing, wherein the longitudinal axis of the pushrod is substantially orthogonal to an axis of rotation of the L-shaped lever;
   a locking lever pivotably connected to the housing, wherein a plane containing the locking lever is substantially orthogonal to the longitudinal axis of the pushrod;
   a cam attached fixedly to the shaft, wherein the cam is substantially within the housing, wherein the cam has a notch, wherein the cam is substantially within the same plane as the plane containing the locking lever, the locking lever further having a tooth, wherein the tooth substantially engages the notch when the headrest is not folded, wherein a coil spring between the housing and the locking lever biases the locking lever toward the cam.

2. The folding headrest of claim 1, further comprising:
   a bumper connected to the housing, wherein the bumper contacts the cam when the headrest is substantially folded.

3. The folding headrest of claim 2, wherein the bumper does not contact the cam when the headrest is not substantially folded.

4. The folding headrest of claim 2, wherein the bumper is comprised of an elastomeric material.

5. The folding headrest of claim 1, wherein each of the first and second mounting rods having an arcuate portion at an end thereof, and wherein the shaft is fixed to the arcuate portions of the first and second mounting rods.

6. The folding headrest of claim 5, wherein the shaft is welded to the arcuate portions of the first and second mounting rods.

\* \* \* \* \*